(No Model.) 2 Sheets—Sheet 1.

W. OSTRANDER.
FENDER FOR HORSE HAY RAKES.

No. 597,170. Patented Jan. 11, 1898.

Witnesses
Richard Paul,
C. E. Van Doren

Inventor
William Ostrander
By Paul & Hawley
his attorneys (No Model.) 2 Sheets—Sheet 2.

W. OSTRANDER.
FENDER FOR HORSE HAY RAKES

No. 597,170. Patented Jan. 11, 1898.

Witnesses:
C. E. Van Doren,
Richard Paul

Inventor:
William Ostrander,
By Paul O. Hawley
his attorneys.

UNITED STATES PATENT OFFICE.

WILLIAM OSTRANDER, OF WATERTOWN, SOUTH DAKOTA.

FENDER FOR HORSE HAY-RAKES.

SPECIFICATION forming part of Letters Patent No. 597,170, dated January 11, 1898.

Application filed June 14, 1897. Serial No. 640,612. (No model.)

*To all whom it may concern:*

Be it known that I, WILLIAM OSTRANDER, of Watertown, Codington county, State of South Dakota, have invented certain new and useful Improvements in Fenders for Horse Hay-Rakes, of which the following is a specification.

My invention relates to horse hay-rakes, and particularly to an attachment to be applied thereto and by means of which the hay is prevented from catching in a wheel and being carried up and wound around the axle or tangled upon the frame of the machine.

The object of the invention is to provide a fender that will stand the rough usage of the field without breaking, which will be sufficiently strong to carry the weight of the machine if necessary, but which will yield in either direction as the machine is drawn along, whereby the breaking or twisting of the fender is prevented.

A further object of the invention is to provide a fender that may be attached to any machine.

The invention consists generally in the combination, with the horse hay-rake, of a sector-like fender to cover a section of the wheel and swing from the axle or axis of the wheel, whereby upon striking an obstruction the fender will rotate until clear thereof.

The invention further consists in particular constructions and combinations of parts, all as hereinafter described, and particularly pointed out in the claims.

The invention will be more readily understood by reference to the accompanying drawings, forming part of this specification, in which—

Figure 1:
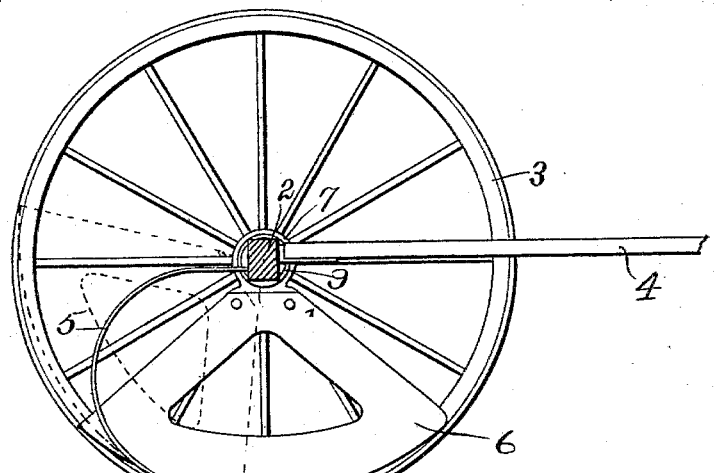
Figure 2:
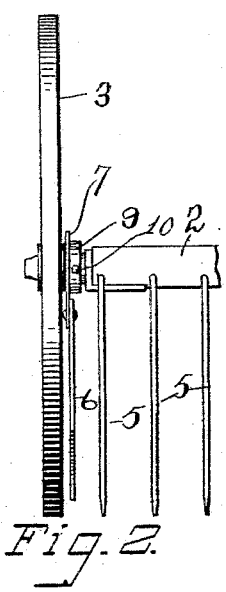
Figure 3:
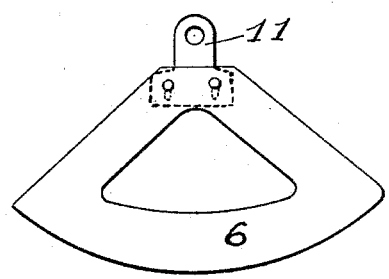
Figure 4:
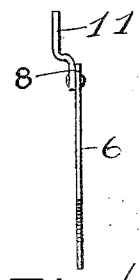
Figure 5:
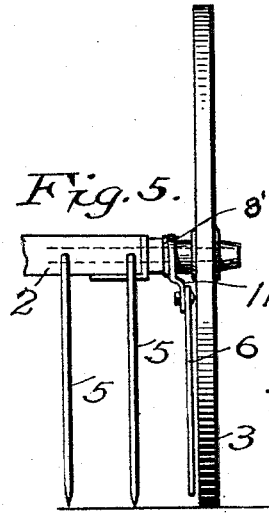
Figure 6:
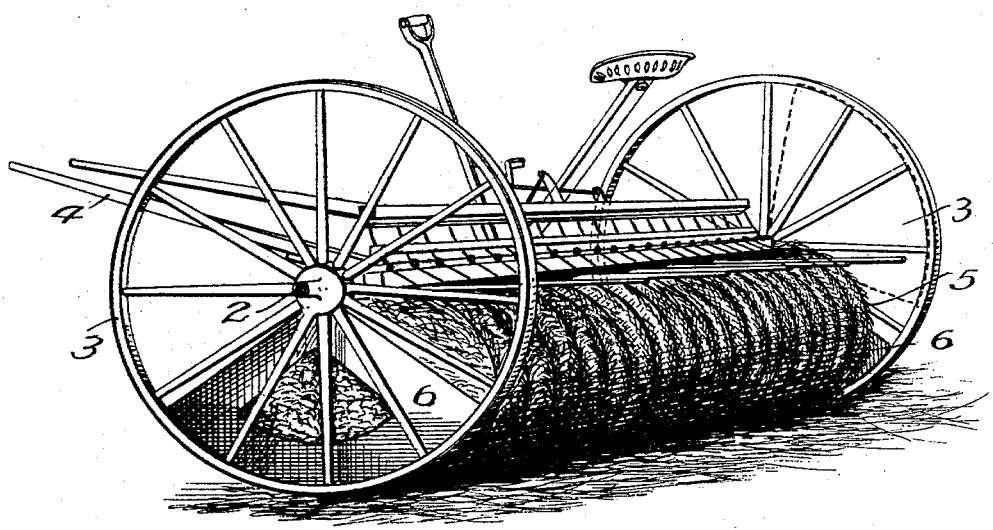
Figure 7:
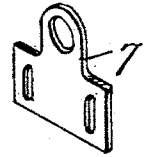
Figure 8:
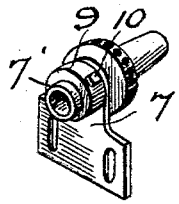
Figure 9:
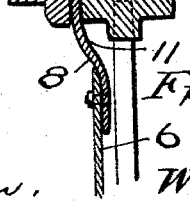

Figure 1 is a sectional view of a rake-frame with my invention applied thereto. Fig. 2 is a rear view of the same. Fig. 3 is a side elevation of one style of the fender or guard. Fig. 4 is an edge view of the same. Fig. 5 is a rear view of a portion of the rake, showing modified means for connecting the fender to the rake-axle. Fig. 6 is a perspective view of a rake with my invention attached thereto, showing at one end the position of the fender when the rake is full of hay and at the other, in dotted lines, the position which the fender may assume upon striking an obstruction. Figs. 7 and 8 are details of the means for securing one form of fender to the rake. Fig. 9 is a sectional view of Fig. 5.

In the drawings, 2 represents the rake-head, to which the axle-brackets are usually attached; 3, the wheel, and 4 the shaft or pole, extending forward from the head of a horse hay-rake of the ordinary construction. The rake-teeth 5 may be attached to the head in any way with suitable means for raising the teeth. The fender 6 is made of sheet metal, wood, or other suitable material, is preferably triangular in form, having a curved lower edge, and is provided at its upper end with an ear or clip 7, securely riveted thereto. This ear or clip is provided with an opening, so that it may be slipped on over the inner end 7' of the hub of the wheel, and the collar 9, having a set-screw 10, is provided on said hub between the ear and the head of the rake to hold the ear in position on the hub. The fender is thus adapted to swing freely backward or forward between the wheel and the teeth of the rake.

Instead of supporting the fender directly upon the hub of the wheel I may provide a clip 11, secured to the upper edge of the fender and having an offset portion, as shown in Figs. 3 and 4. When this construction is used, the part 11 is provided with an opening to adapt it to be placed on the axle, which does not revolve. In this construction the fender-clip 11 is held between the hub and the shoulder 8' on the axle. I prefer to use this construction when the fender is to be attached to the rake by the manufacturer, in which case the hub of the wheel may be shortened a little and the head of the rake also, if necessary. This method of attaching the fender to the rake is extremely simple and inexpensive. The method of attaching the fender shown in Fig. 2 permits the device to be attached to almost any style of rake that is now in use. Instead of permanently securing the ears or clips to the upper edge of the fender I may provide a series of openings in them or a series of slots, so that they may be raised or lowered, according to the height of the rake-axle from the ground. This method of attaching the clip to the fender is indicated by dotted lines in Fig. 3.

I have found it very essential to arrange the fender or guard so that it will swing back and forth freely upon its support while the rake is in use. I have also found in raking a field that frequently one and sometimes both of the wheels will drop into a rut or depression in the surface of the ground, and if the fenders are rigidly secured upon the axle the entire weight of the rake and the rider is thrown upon the same, with the result that the fender or guard would be broken or torn off as the machine is drawn ahead.

It will be noted by reference to Figs. 1, 2, and 3 that the lower edge of the fender is not made in the same arc as the periphery of the wheel. This is in order that the bottom of the fender shall not strike the ground ordinarily even when the wheel naturally sinks slightly into the turf. It will also be noted that the ends or corners of the fender overlap the felly of the wheel, so that the fender will never crowd back into the spokes. By providing a swinging fender I have obviated this difficulty. If the wheels drop into a hole, the curved lower edge of the fender will strike the surface of the ground and, swinging back, will permit the weight to be borne entirely by the rake-wheels. If in moving over the field the fender strikes an obstruction, it will swing back until the rake has passed over it, when the fender will drop back into its normal vertical position. The same is true when the rake-wheels move out of a rut or hole into which they may have dropped. If it is desired to back the rake at any time, the fender will swing forward and allow the rake to pass over any obstruction and will then drop back into position to guard the wheel. With this construction I am enabled to use a rake on a very rough field, where a rigid fender would be broken and rendered useless in a very short space of time.

A further advantage to be derived from the use of the swinging fender lies in the fact that as the rake-teeth gather up the hay and are pushed back by the pressure of the same the swinging fender will follow the teeth and hay and prevent the latter from getting into the spokes of the wheel.

I have also found it very important to provide a fender of such shape and size that it will cover and protect all the spokes in the wheel that are exposed to contact with the hay as it is rolled up in the rake. Unless these spokes are covered the hay will pass out at each end of the rake and, coming in contact with the spokes, will be drawn out and scattered over the ground. I may provide the fender with a central opening which will reduce the weight of the same and at the same time will not weaken it materially at any point nor permit the hay to pass through and come in contact with the spokes of the wheel.

Having thus described my invention, I claim as new and desire to secure by Letters Patent—

1. The combination with a hay-rake, of a fender arranged upon the inner side of the wheel thereof and covering a large section of the same, and said fender being pivoted to swing about the axis of said wheel between the wheel and the rake-teeth, and adapted, if need be, to make a complete revolution about said axis substantially as described.

2. In a hay-rake, the combination with the wheeled frame, and the axle and teeth carried thereby, of the fender having a curved lower edge and arranged to swing backward and forward between the teeth of the rake and the wheel, and upon or about the axis of the wheel as a center for the purpose set forth.

3. The combination, with a hay-rake, of a fender substantially conforming to a large sector of the wheel of the rake, the ends or corners of said fender overlapping the felly of the wheel, and the bottom of the fender being slightly above the bottom of the wheel, and said fender being adapted to swing backward and forward, as and for the purpose specified.

4. In a machine of the class described, the combination, with the wheeled frame and the teeth carried thereby, fenders 6, the clip or ear 8 for each fender, and provided with an offset portion journaled to rotate upon the axle-arm, and means for adjustably securing the fenders upon their respective ears or clips, substantially as described.

In testimony whereof I have hereunto set my hand this 10th day of June, A. D. 1897.

WILLIAM OSTRANDER.

In presence of—
C. G. HAWLEY,
RICHARD PAUL.